Oct. 24, 1944. S. R. CARLSON 2,361,085
LATHE SPINDLE STOP
Filed March 4, 1943 2 Sheets-Sheet 1

INVENTOR.
Sven R. Carlson
BY
Zoltan A. Holochek
ATTORNEY

Oct. 24, 1944.  S. R. CARLSON  2,361,085
LATHE SPINDLE STOP
Filed March 4, 1943  2 Sheets-Sheet 2

INVENTOR.
Sven R. Carlson
BY
ATTORNEY

Patented Oct. 24, 1944

2,361,085

UNITED STATES PATENT OFFICE 2,361,085

LATHE SPINDLE STOP

Sven R. Carlson, Floral Park, N. Y.

Application March 4, 1943, Serial No. 477,920

9 Claims. (Cl. 82—34)

This invention relates to new and useful improvements in a lathe spindle stop.

More particularly, the invention proposes a stop intended particularly to be used in the hollow spindle of a lathe. The purpose of this stop is to limit the distance to which work which is to be operated upon by the lathe can be placed into the hollow spindle.

The invention proposes to characterize the stop by an elongated member adapted to slidably engage in the hollow spindle so that it may be placed in any selected position, and a novel latch device for securely holding the elongated member as placed.

The invention furthermore contemplates providing the elongated member with an adjustable abutment which may be adjusted to control the position of work extended into the spindle.

Still further the invention proposes to characterize the locking means by a friction operative bolt transversely slidably mounted on the side of said member and adapted to engage the face of the bore of the hollow spindle for locking the elongated member in position.

The invention further contemplates the provision of a rod coaxially slidably mounted in the member and having cam elements cooperative with cam elements on the bolt for forcing the bolt outwards as the rod is moved forwards. It is proposed that the elongated member be provided with a screw engaging the rod by which the rod may be forced forwards.

Still further the invention contemplates various modified forms distinguishing from each other in the latching mechanism for securely holding the elongated member in position.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 6 is a fragmentary sectional view similar to Fig. 2 but illustrating a modified construction.

Figure 1:
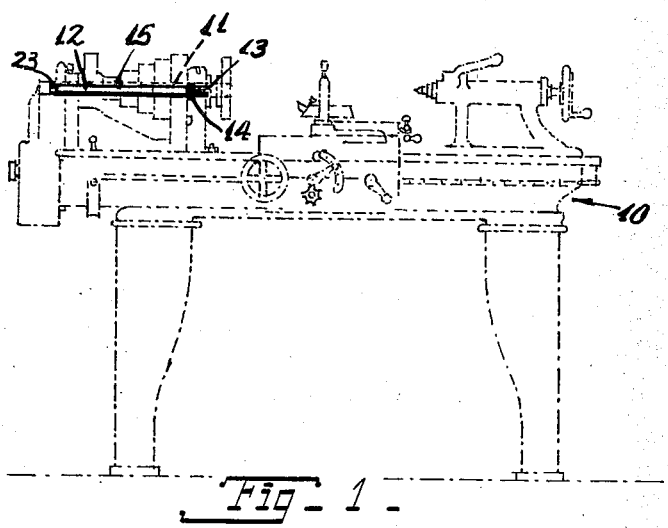
Fig. 1 is a schematic view of a lathe having a hollow spindle and equipped with a spindle stop constructed in accordance with this invention.
Figure 2:
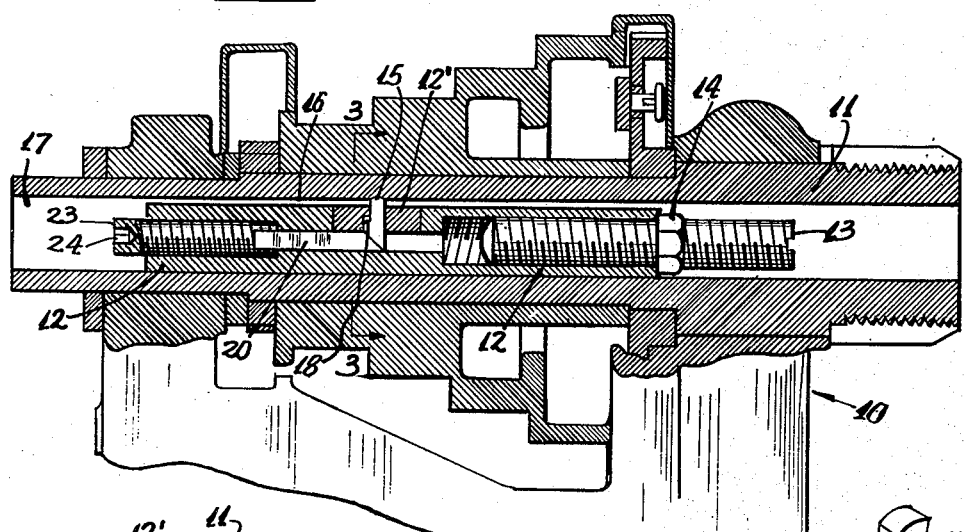
Fig. 2 is a fragmentary enlarged sectional view of a portion of the lathe showing the hollow spindle and the spindle stop.
Figures 3, 4, 5:
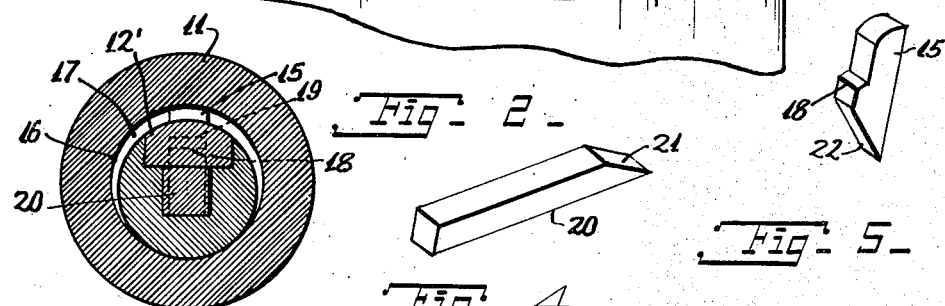
Fig. 3 is a fragmentary enlarged transverse sectional view taken on the line 3—3 of Fig. 2.
Fig. 4 is a perspective view of the rod used in the locking mechanism.
Fig. 5 is a perspective view of the friction operative bolt.

In Fig. 1 a lathe 10 is schematically illustrated. This lathe is of a type having a hollow spindle 11 into which work may be engaged. This work may be gripped and held by the usual chuck or other holding means. The particular details of the lathe and spindle form no part of the invention. The invention resides in the construction of a lathe spindle stop intended to be mounted within the spindle 11, as clearly shown for example in Fig. 2. In one form of this invention this stop includes an elongated member 12 adapted to slidably engage in the hollow spindle 11. An abutment 13 for the work is adjustably mounted on the front end of the member 12. This abutment is in the nature of a screw threadedly engaged in the front end of the member 12. A nut 14 threadedly engages the screw 13 and abuts the end of the member 12 for holding the abutment member in selected projecting positions on the member 12.

A friction operative bolt 15 is transversely slidably mounted on the side of the member 12 and is for the purpose of engaging the face 16 of the bore 17 of the hollow spindle 11. The bolt 15 has a shoulder 18 located inwards of and cooperative with a shoulder 19 upon the side of the opening in the member 12 through which the bolt extends. These shoulders limit extension of the bolt 15 so that it is not free to fall from the elongated member 12 when the spindle stop is not being used.

A rod 20 is coaxially slidably mounted in the member 12. This rod is shown square in transverse cross section, though this is merely a matter of design as it may be of different shapes. Cooperative cam elements 21 and 22 are formed on the rod 20 and the bolt 15 for forcing the bolt outwards, as the rod is moved forwards. These cooperative cam elements are in the nature of inclined complementary faces. A screw 23 is threadedly mounted on the rear end of the member 12 and abuts against the rod 20 and is for the purpose of moving the rod forwards to extend the bolt 15. This screw 23 has a socket opening 24 for a suitable turning tool by which the screw may be manipulated.

The operation of the device is as follows:

The screw 23 is loosened so that the rod 20 may move slightly rearwards freeing the bolt 15 which then may move inwards. The spindle stop may now be removed from the spindle 11 or may be moved to a new selected position. If removed, the abutment member 13 may be adjusted, if this is desired, by extending or retracting it relative to the member 12.

The spindle stop may be fastened in any position within the hollow spindle 11 merely by placing a rod through the front end of the spindle 11 and against the abutment member 13 to hold the spindle stop temporarily in position. Then, with a turning tool engaged through the rear end of the spindle 11, the screw 23 is turned inwards to move the rod 20 forwards so that the cooperative cam elements 21 and 22 coact to extend the bolt 15. The bolt is forced against the face of the bore of the spindle 11, locking the spindle stop in position.

The elongated member 12 is illustrated as formed with an insert 12' surrounding the bolt 15. This is merely an expedient in manufacturing the spindle stop so that the bolt 15 may be mounted in position. However, instead of the insert 12' a different method may be used for slidably mounting the bolt 15 but restraining it from coming out and being lost.

Figure 7:
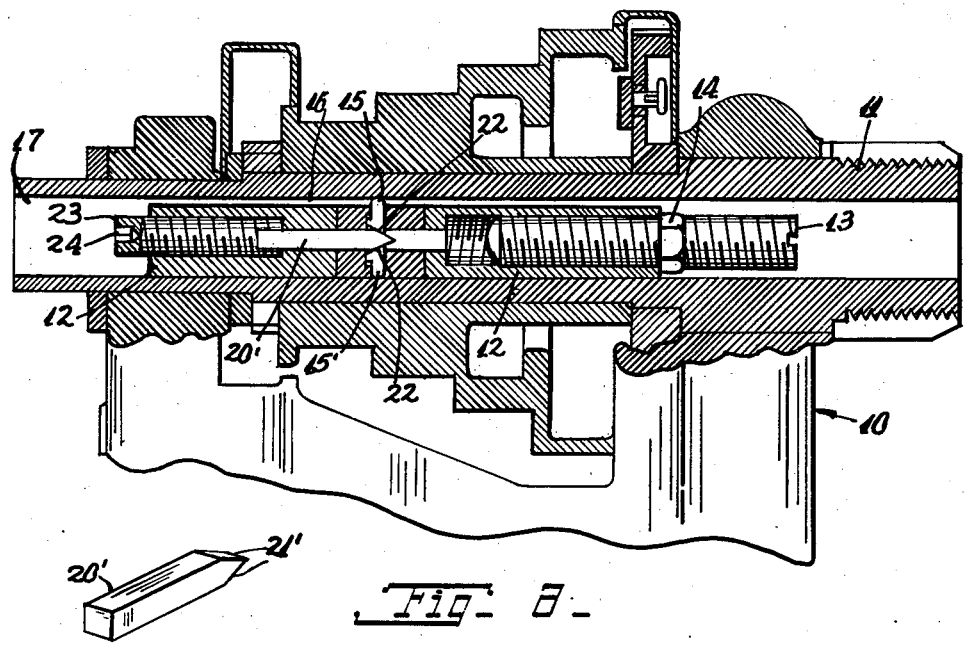
Fig. 7 is a perspective view of the rod used in Fig. 6.

In Figs. 6 and 7 a modified form of the invention has been disclosed which is very similar to the prior form, distinguishing merely in the fact that an auxiliary bolt 15' is slidably mounted upon the elongated member 15 diametrically opposite to the bolt 15. A rod 20' is slidably mounted in the member 12 and is provided with a double cam 21' cooperative with the complementary cam elements 22 of the bolts 15. In other respects this form of the invention is identical to the previous form and like parts are indicated by like reference numerals.

The operation of this form of the invention is substantially identical to the prior form, distinguishing merely in the fact that when the screw 23 is driven forwards the rod 20' will be correspondingly moved and will simultaneously extend the bolts 15 and 15' against the opposite faces of the bore of the spindle 11. Thus, the spindle stop is more securely held in position.

Figures 8, 9:
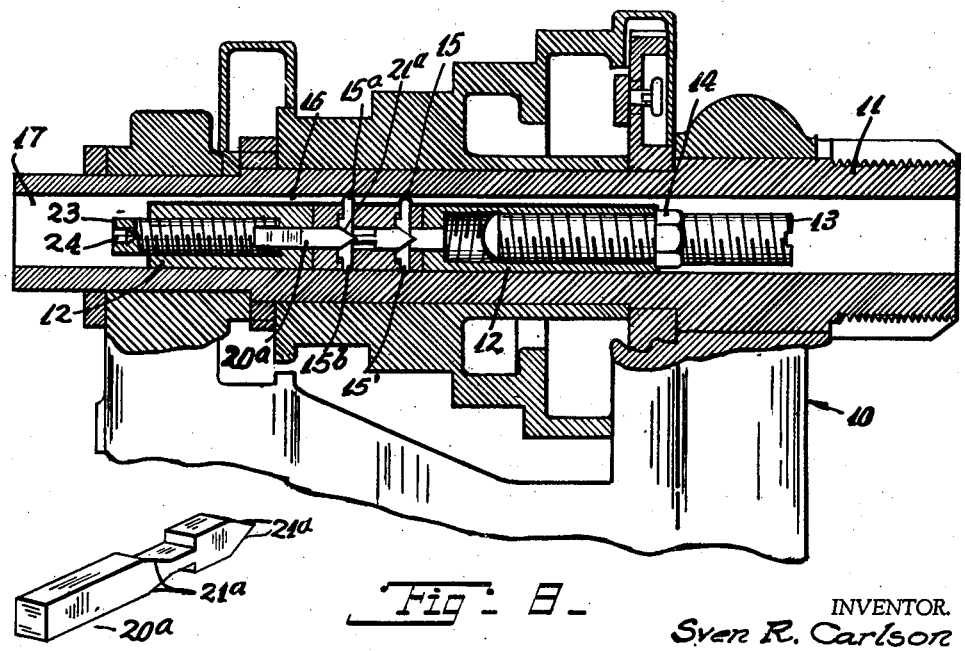
Fig. 8 is another fragmentary sectional view similar to Fig. 2 but illustrating another modified form of the invention.
Fig. 9 is a perspective view of the rod used in Fig. 8.

In Figs. 8 and 9 still another modified form of the invention is disclosed which distinguishes from the form shown in Figs. 6 and 7 in the fact that auxiliary bolts 15ᵃ and 15ᵇ are used in addition to the bolts 15 and 15'. These auxiliary bolts are spaced longitudinally of said bolts 15 and 15'. A rod 20ᵃ is slidably mounted on the member 12 and is provided with a plurality of cam surfaces 21ᵃ cooperative with complementary cam surfaces of the various bolts for simultaneously extending the bolts when the rod is moved forwards. When the rod is moved rearwards the bolts are released.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In combination with a hollow spindle, an elongated member adapted to slidably engage in said hollow spindle, an abutment for the work adjustably mounted on the front end of said member, a friction operative bolt transversely slidably mounted upon the side of said member for engaging the face of the bore of said hollow spindle, a rod coaxially slidably mounted in said member, cooperative cam elements on rod and bolt for forcing the bolt outwards as the rod is moved forwards, and a screw mounted on the rear of said member for forcing said rod forwards.

2. In combination with a hollow spindle, an elongated member adapted to slidably engage in said hollow spindle, an abutment for the work adjustably mounted on the front end of said member, a friction operative bolt transversely slidably mounted upon the side of said member for engaging the face of the bore of said hollow spindle, a rod coaxially slidably mounted in said member, cooperative cam elements on rod and bolt for forcing the bolt outwards as the rod is moved forwards, and a screw mounted on the rear of said member for forcing said rod forwards, said abutment member comprising a screw threadedly engaged in the front of said member.

3. In combination with a hollow spindle, an elongated member adapted to slidably engage in said hollow spindle, an abutment for the work adjustably mounted on the front end of said member, a friction operative bolt transversely slidably mounted upon the side of said member for engaging the face of the bore of said hollow spindle, a rod coaxially slidably mounted in said member, cooperative cam elements on rod and bolt for forcing the bolt outwards as the rod is moved forwards, and a screw mounted on the rear of said member for forcing said rod forwards, said abutment member comprising a screw threadedly engaged in the front of said member, and a nut for locking said screw in adjusted position.

4. In combination with a hollow spindle, an elongated member adapted to slidably engage in said hollow spindle, an abutment for the work adjustably mounted on the front end of said member, a friction operative bolt transversely slidably mounted upon the side of said member for engaging the face of the bore of said hollow spindle, a rod coaxially slidably mounted in said member, cooperative cam elements on rod and bolt for forcing the bolt outwards as the rod is moved forwards, and a screw mounted on the rear of said member for forcing said rod forwards, said bolt being provided with a shoulder of an inner portion cooperative with a complementary outer shoulder on said elongated member for limiting extension of the bolt.

5. In combination with a hollow spindle, an elongated member adapted to slidably engage in said hollow spindle, an abutment for the work adjustably mounted on the front end of said member, a friction operative bolt transversely slidably mounted upon the side of said member for engaging the face of the bore of said hollow spindle, a rod coaxially slidably mounted in said member, cooperative cam elements on rod and bolt for forcing the bolt outwards as the rod is moved forwards, and a screw mounted on the rear of said member for forcing said rod forwards, said cam elements comprising inclined surfaces.

6. In combination with a hollow spindle, an elongated member adapted to slidably engage in said hollow spindle, an abutment for the work adjustably mounted on the front end of said member, a friction operative bolt transversely slidably mounted upon the side of said member for engaging the face of the bore of said hollow spindle, a rod coaxially slidably mounted in said member, cooperative cam elements on rod and bolt for forcing the bolt outwards as the rod is moved forwards, and a screw mounted on the rear of said member for forcing said rod forwards, said rod being non-circular in transverse cross section and engaging a complementary shaped opening in said member.

7. In combination with a hollow spindle, an elongated member adapted to slidably engage in said hollow spindle, an abutment for the work adjustably mounted on the front end of said member, a friction operative bolt transversely slidably mounted upon the side of said member for engaging the face of the bore of said hollow spindle, a rod coaxially slidably mounted in said member, cooperative cam elements on rod and bolt for forcing the bolt outwards as the rod is moved forwards, a screw mounted on the rear of said member for forcing said rod forwards, and auxiliary bolts transversely slidably mounted on said member for engaging the face of the bore of said hollow spindle at various points, said rod being provided with auxiliary cams cooperative with cam elements on the auxiliary bolts for simultaneously forcing the bolts outwards as the rod is moved forwards.

8. In combination with a hollow spindle, an elongated member adapted to slidably engage in said hollow spindle, an abutment for the work adjustably mounted on the front end of said member, a friction operative bolt transversely slidably mounted upon the side of said member for engaging the face of the bore of said hollow spindle, a rod coaxially slidably mounted in said member, cooperative cam elements on rod and bolt for forcing the bolt outwards as the rod is moved forwards, a screw mounted on the rear of said member for forcing said rod forwards, and auxiliary bolts transversely slidably mounted on said member for engaging the face of the bore of said hollow spindle at various points, said rod being provided with auxiliary cams cooperative with cam elements on the auxiliary bolts for simultaneously forcing the bolts outwards as the rod as moved forwards, said bolts being diametrically opposite each other.

9. In combination with a hollow spindle, an elongated member adapted to slidably engage in said hollow spindle, an abutment for the work adjustably mounted on the front end of said member, a friction operative bolt transversely slidably mounted upon the side of said member for engaging the face of the bore of said hollow spindle, a rod coaxially slidably mounted in said member, cooperative cam elements on rod and bolt for forcing the bolt outwards as the rod is moved forwards, a screw mounted on the rear of said member for forcing said rod forwards, and auxiliary bolts transversely slidably mounted on said member for engaging the face of the bore of said hollow spindle at various points, said rod being provided with auxiliary cams cooperative with cam elements on the auxiliary bolts for simultaneously forcing the bolts outwards as the rod is moved forwards, said bolts being longitudinally spaced of each other.

SVEN R. CARLSON.